United States Patent
Li et al.

(10) Patent No.: US 10,209,885 B2
(45) Date of Patent: Feb. 19, 2019

(54) METHOD AND DEVICE FOR BUILDING VIRTUAL KEYBOARD

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Kun Li, Beijing (CN); Zhiqin Zhang, Beijing (CN); Youngyik Ko, Beijing (CN); Feng Bai, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu (CN)

( * ) Notice: Subject to any disclaimer, the term of this patent is extended or adjusted under 35 U.S.C. 154(b) by 381 days.

(21) Appl. No.: 14/409,702

(22) PCT Filed: May 29, 2014

(86) PCT No.: PCT/CN2014/078793
§ 371 (c)(1),
(2) Date: Dec. 19, 2014

(87) PCT Pub. No.: WO2015/043218
PCT Pub. Date: Apr. 2, 2015

(65) Prior Publication Data
US 2016/0274788 A1 Sep. 22, 2016

(30) Foreign Application Priority Data
Sep. 27, 2013 (CN) .......................... 2013 1 0451249

(51) Int. Cl.
*G06F 3/0488* (2013.01)
*G06F 3/044* (2006.01)
(Continued)

(52) U.S. Cl.
CPC ........ *G06F 3/04886* (2013.01); *G06F 1/1694* (2013.01); *G06F 3/044* (2013.01);
(Continued)

(58) Field of Classification Search
CPC .... G06F 3/04886; G06F 3/0416; G06F 3/044; G06F 3/04845; G06F 3/04883; G06F 1/1694; G06F 2203/04104
(Continued)

(56) References Cited

U.S. PATENT DOCUMENTS

2011/0078614 A1* 3/2011 Lee ..................... G06F 3/04886
715/773
2012/0235919 A1* 9/2012 Earnshaw ........... G06F 3/04886
345/169
(Continued)

FOREIGN PATENT DOCUMENTS

| CN | 1641538 A | 7/2005 |
|---|---|---|
| CN | 101183296 A | 5/2008 |

(Continued)

OTHER PUBLICATIONS

First Office Action regarding Chinese application No. 201310451249. X, dated Dec. 10, 2015. Translation provided by Dragon Intellectual Property Law Firm.
(Continued)

*Primary Examiner* — Ajay M Bhatia
*Assistant Examiner* — Mong-Shune Chung
(74) *Attorney, Agent, or Firm* — Harness, Dickey & Pierce, P.L.C.

(57) ABSTRACT

The present disclosure discloses a method and a device for building a virtual keyboard. The method includes the steps: detecting a touch area of finger operation; determining the number of keys to be arranged in a key region of the virtual keyboard according to the detected touch area of finger
(Continued)

operation and an area of the key region of the virtual keyboard; and arranging the determined number of keys in the key region of the virtual keyboard according to a preset strategy. The number of keys arranged in a key region of the virtual keyboard is determined in the present disclosure according to the touch area of user's finger operation and the area of the key region of the virtual keyboard so that the area of each key in the virtual keyboard is adaptable to the touch area of fingers.

18 Claims, 7 Drawing Sheets

(51) Int. Cl.
  *G06F 3/0484* (2013.01)
  *G06F 1/16* (2006.01)
  *G06F 3/041* (2006.01)

(52) U.S. Cl.
  CPC ........ *G06F 3/0416* (2013.01); *G06F 3/04845* (2013.01); *G06F 3/04883* (2013.01); *G06F 2203/04104* (2013.01)

(58) Field of Classification Search
  USPC .......................................................... 715/773
  See application file for complete search history.

(56) References Cited

U.S. PATENT DOCUMENTS

| | | | |
|---|---|---|---|
| 2013/0002562 A1* | 1/2013 | Leskela | G06F 3/04886 345/169 |
| 2013/0212515 A1 | 8/2013 | Eleftheriou | |
| 2014/0282203 A1* | 9/2014 | Pasquero | G06F 3/04886 715/773 |
| 2014/0320411 A1* | 10/2014 | Kuzmin | G06F 3/04886 345/168 |
| 2015/0301740 A1* | 10/2015 | Bozzini | G06F 3/04886 715/773 |

FOREIGN PATENT DOCUMENTS

| | | |
|---|---|---|
| CN | 101477431 A | 7/2009 |
| CN | 102117164 A | 7/2011 |
| CN | 103488400 A | 1/2014 |
| WO | WO-2012-083499 A1 | 6/2012 |

OTHER PUBLICATIONS

Written Opinion of the International Searching Authority for international application No. PCT/CN2014/078793.
Second Office Action regarding Chinese application No. 201310451249.X, dated May 3, 2016. Translation provided by Dragon Intellectual Property Law Firm.

* cited by examiner

METHOD AND DEVICE FOR BUILDING VIRTUAL KEYBOARD

CROSS-REFERENCE TO RELATED APPLICATIONS

The present application is the U.S. national phase of PCT Application No. PCT/CN2014/078793 filed on May 29, 2014, which claims priority to the Chinese application No. 201310451249.X filed on Sep. 27, 2013, the entire contents of each of which are incorporated herein by reference.

TECHNICAL FIELD

The present disclosure relates to the virtual keyboard of a touch control equipment, in particular to a method and device for building the virtual keyboard.

BACKGROUND

Currently, the touch screen of touch control equipments gives users more intuitive human-machine interaction experience while facilitating users' operation as a result of integrating input and output into the same screen. A virtual keyboard in the touch screen is often used to perform inputting of characters. Due to the restriction of size of small-sized touch screen, if all keys such as number and letter keys are displayed in the virtual keyboard, it may lead to oversmall area of each key. When performing finger touching operation, it is quite easy for the user to press keys wrongly and cause operational errors, and for small and medium sized touch control equipments, people are accustomed to one-hand operation, namely, holding the touch control equipment with a hand and using a thumb to touch the screen. However, the thumb's press area is greater than other finger's press area apparently, resulting in a greater probability of occurrence of misoperation. Furthermore, the touch screen provides a display area for displaying user's operation information in addition to a key region of the virtual keyboard, so the area of the key region is further compressed and then the area of each key in the key region is influenced, which makes misoperation as a result of pressing keys wrongly more easily occur. The user has to sacrifice his inputting speed to avoid the occurrence of misoperation, which affects user's experience.

SUMMARY

With respect to the problem existing in the prior art, the object of the present disclosure lies in providing a method and device for building a virtual keyboard for facilitating one-hand operation, reducing the probability of misoperation in one-hand operation.

To achieve the above object, a method for building a virtual keyboard for use in a touch control equipment in an embodiment of the present disclosure comprises a detecting step, for detecting a touch area of finger operation; a key number determining step, for determining the number of keys to be arranged in a key region of the virtual keyboard according to the detected touch area of finger operation and an area of the key region of the virtual keyboard; and a key arranging step, for arranging the determined number of keys in the key region of the virtual keyboard according to a preset strategy.

Further, the keys of the virtual keyboard comprise digit group keys, letter group keys, punctuation group keys and function group keys; in the key arranging step, keys, the number thereof corresponding to the determined number of the keys are selected at random from the digit group keys, letter group keys, punctuation group keys and function group keys according to the determined number of the keys, and the selected keys are arranged in the key region of the virtual keyboard.

Further, the keys of the virtual keyboard comprise digit group keys, letter group keys, punctuation group keys and function group keys; in the key arranging step, keys, the number thereof less than or equal to the determined number of the keys are selected from the digit group keys, letter group keys, punctuation group keys and function group keys according to the determined number of the keys and operation habits, and the selected keys are arranged in the key region of the virtual keyboard.

Further, the keys of the virtual keyboard comprise digit group keys, letter group keys, punctuation group keys and function group keys; in the key arranging step, the determined number of keys are arranged in the key region of the virtual keyboard, a number of key values defined on each of the keys arranged in the key region is determined according to the determined number of the keys and the total number of the digit group keys, the letter group keys, the punctuation group keys and the function group keys, and a correspond number of key values are defined on each of the keys, the key values corresponding to key values of keys in the digit group keys, the letter group keys, the punctuation group keys and the function group keys.

Further, the method for building the virtual keyboard further comprises a display step after the key arranging step, for displaying the virtual keyboard in which the keys are arranged in a touch screen of the touch control equipment.

Further, the virtual keyboard comprises a current virtual keyboard displayed in a current display interface of the touch screen and a target virtual keyboard displayed in a next display interface of the touch screen, the current virtual keyboard and the target virtual keyboard having different key arrangement; the method for building the virtual keyboard further comprises a switching step, for receiving a switch command of the virtual keyboard, and switching between the current virtual keyboard and the target virtual keyboard according to the switch command of the virtual keyboard.

Further, the touch control equipment is provided with a keyboard switching key, and the received switch command of the virtual keyboard is a command issued when the keyboard switching key is pressed.

Further, the touch control equipment is provided with a gesture collecting device for collecting gesture operation corresponding to the switch command, and the received switch command of the virtual keyboard is a command issued when the gesture collecting device collects the gesture operation.

Further, the touch control equipment is provided with a gravity sensor for collecting sensing signals corresponding to the switch command, and the received switch command of the virtual keyboard is a command issued when the gravity sensor collects the sensing signals.

Further, the touch control device is provided with a sound sensor for collecting sensing signals corresponding to the switch command, and the received switch command of the virtual keyboard is a command issued when the sound sensor collects the sensing signals.

Further, the detecting of the touch area of finger operation specifically comprises: detecting data of capacitance variation of the touch screen in the finger operation, calculating coordinates of all touch points on the touch screen in the finger operation according to the data of the capacitance variation, and then obtaining the touch area of the finger operation through the coordinates of the touch points.

A device for building the virtual keyboard for use in a touch control equipment in an embodiment of the present disclosure comprises a detecting module, a processing module and a key arranging module, wherein the detecting module is configured to detect a touch area of finger operation; the processing module is configured to determine the number of keys to be arranged in a key region of the virtual keyboard according to the detected touch area of finger operation and an area of the key region of the virtual keyboard; and the key arranging module is configured to arrange the determined number of keys in the key region of the virtual keyboard according to a preset strategy.

Further, the device for building the virtual keyboard further comprises a displaying module configured to display the virtual keyboard in which the keys are arranged in a touch screen of the touch control equipment.

Further, the virtual keyboard comprises a current virtual keyboard displayed in a current display interface of the touch screen and a target virtual keyboard displayed in a next display interface of the touch screen of the touch control equipment, the current virtual keyboard and the target virtual keyboard having different key arrangement; the device for building the virtual keyboard further comprises a keyboard switching module configured to receive a switch command of the virtual keyboard and switch between the current virtual keyboard and the target virtual keyboard according to the switch command of the virtual keyboard.

The number of keys arranged in a key region of the virtual keyboard is determined in the disclosure according to the touch area of user's finger operation and the area of the key region of the virtual keyboard so that the area of each key in the virtual keyboard is adaptable to the touch area of fingers, and thereby one-hand operation of a user can be facilitated, and the probability of misoperation in one-hand operation is reduced.

DETAILED DESCRIPTION

To make the objects, the technical solutions and the advantages of the present disclosure more apparent, the disclosure will be described hereinafter detailedly in conjunction with the drawings and the embodiments.

Figure 1:
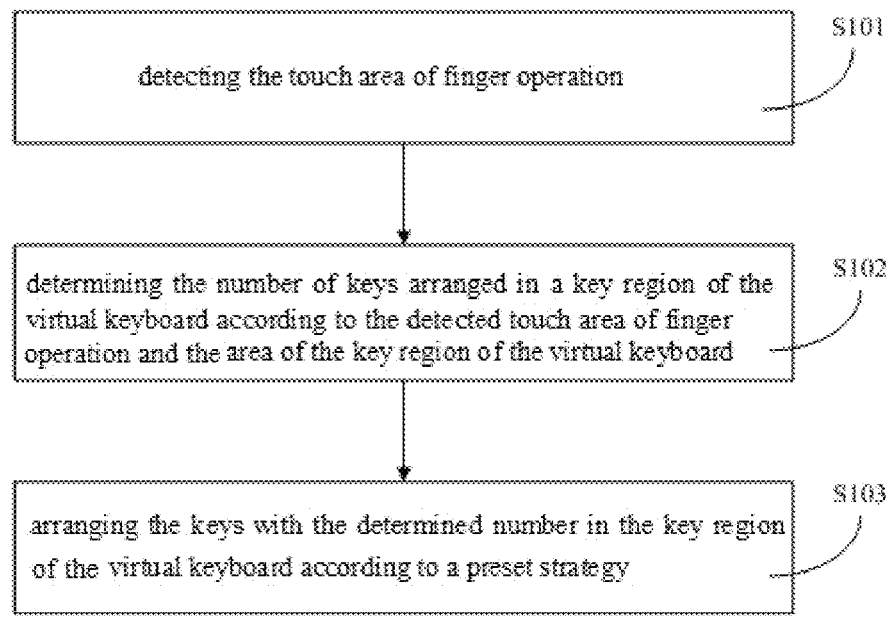
FIG. 1 is a flowchart showing a method for building a virtual keyboard as provided in the embodiment of the present disclosure.

As shown in FIG. 1, a method for building a virtual keyboard for use in a touch control equipment in the embodiment of the present disclosure comprises the steps of:

Step S101 (step of detecting): detecting a touch area of finger operation;

Step S102 (step of determining): determining the number of keys to be arranged in a key region of the virtual keyboard according to the detected touch area of finger operation and an area of the key region of the virtual keyboard;

Step S103 (step of arranging): arranging the determined number of keys in the key region of the virtual keyboard according to a preset strategy.

determining the number of keys arranged in a key region of the virtual keyboard according to the detected touch area of finger operation and the area of the key region of the virtual keyboard specifically refers to performing a division operation on the area of the key region of the virtual keyboard and the touch area of finger operation, taking an integer part of the obtained calculation result as a maximum value of the number of the keys that can be arranged in the virtual keyboard, so that the value range of the number of the keys that can be arranged in the virtual keyboard is 1 to the maximum value. In order to facilitate operation, it is considered that the number of the keys arranged in the virtual keyboard alternatively takes the maximum value. For example, when a user performs a thumb touch operation, the touch area of thumb is $a CM^2$, but the total area of the key region of the virtual keyboard is $A CM^2$, thereby $A/a=N \cdot n$ (N is an integer part of the calculation result, and n is a fractional part thereof), wherein the number of the keys arranged in the key region of the virtual keyboard is ≤N, alternatively, is N; if a=1 and A=15, the number of the keys arranged in the key region of the virtual keyboard is 15.

Arranging the determined number of keys in the key region of the virtual keyboard according to a preset strategy refers to selecting a number of keys corresponding to the determined number of the keys from the digit group keys, letter group keys, punctuation group keys and function group keys according to user's operation habits, and arranging the selected keys in the key region of the virtual keyboard evenly based on the area. For example, if the determined number of the keys in the virtual keyboard is 15, 15 keys need to be selected at random from digit group keys 0-9, letter group keys A-Z, various punctuation keys and function keys such as a backspace key, a delete key, a shift key, page up and down keys, and the 15 selected keys are arranged in the key regions of the virtual keyboard evenly. The area of each key in the key regions of the virtual keyboard built according to the above method can be ensured to be greater than and equal to the touch area of a finger, and under the condition that the area of the entire key region does not change, the area of each key is increased, which can avoid misoperation effectively, but does not affect the displaying of other contents due to overlarge area of the key region, and is quite suitable to be applied to small-sized (3.5 inches) touch screen.

The preferable principle for selecting keys from all digit group keys, letter group keys, punctuation group keys and function group keys is to select according to user's operation habits (for example, frequency of using keys), for example, alternatively select keys that the user often uses. Supposing that the user often uses letter keys: A, S, D, F, H, J, K and L, number keys: 0, 1, 2 and 3, punctuation keys: comma and period, and function keys: delete key, if the number of the above keys is equal to the determined number of keys, the above keys are selected and arranged in the key region evenly; if the number of keys that the user often uses is less than the determined number of keys, based on the selection of the above keys, insufficient keys are selected separately from the digit group keys, letter group keys, punctuation group keys and function group keys, and arranged together in the key region evenly; if the number of keys that the user often uses is greater than the determined number of keys, a number of keys corresponding to the determined number of keys are selected from the keys that the user often uses, and arranged in the key region evenly. Besides, the position of arranging the selected keys in the key region can be set at random according to user's operation habits. For example, three lines of keys in total are arranged in the key region, each of the three lines of keys are provided with 5 keys, the bottommost line is provided with A, S, D, F and H in order, the middle line is provided with J, K, L, 0 and 1 in order, and the uppermost line is provided with 2, 3, comma, period and delete key in order. The arrangement position of the keys as listed is merely for specifying the specific way for arranging the keys in the key region more clearly, but not for limiting the position arrangement of the keys in the key regions. The user may modify the position arrangement of the keys in the key region according to one's own operation habit, for example, the bottommost line is provided with J, K, L, 0 and 1 in order, the middle line is provided with 2, 3, comma, period and delete key in order, and the uppermost line is provided with A, S, D, F and H in order.

Figure 2A:
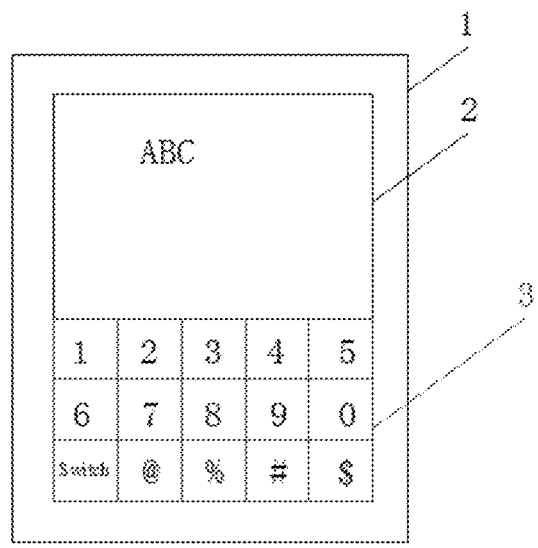
FIGS. 2A-2C are schematic views showing a virtual keyboard built according to the method for building the virtual keyboard as provided in the embodiment of the present disclosure when performing an input operation by applying a calling program.
Figure 2B:
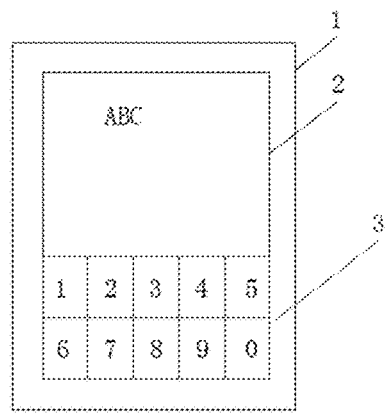
Figure 2C:
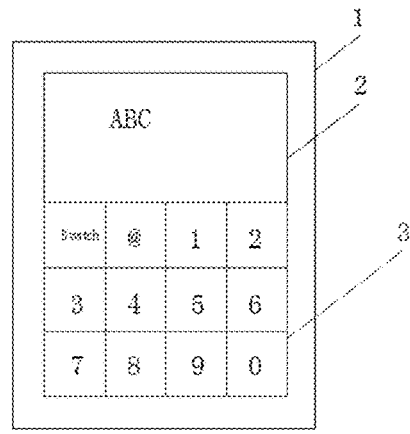
Figure 3A:
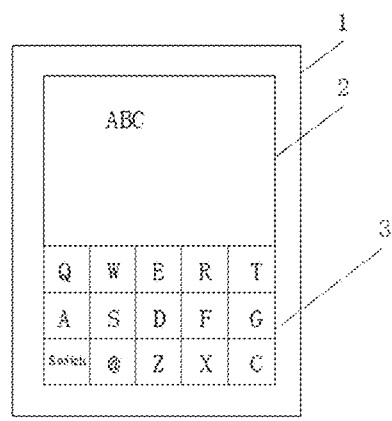
FIGS. 3A-3D are schematic views showing a virtual keyboard built according to the method for building the virtual keyboard as provided in the embodiment of the present disclosure when performing an input operation by applying programs such as sending a message and microblogging.
Figure 3B:
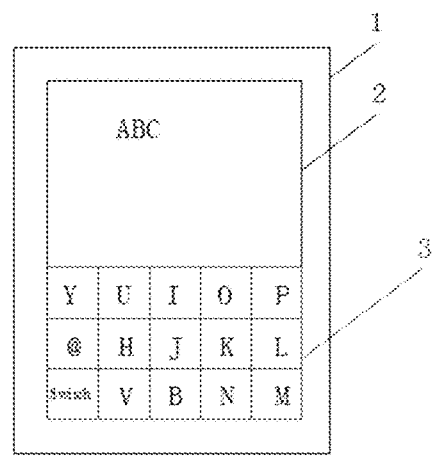
Figure 3C:
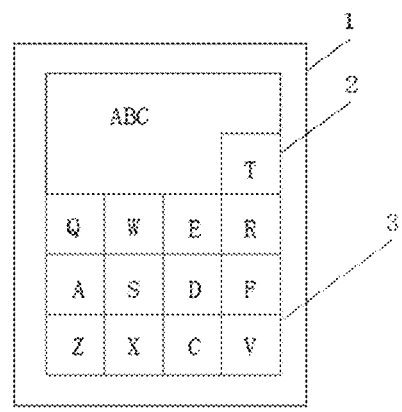
Figure 3D:
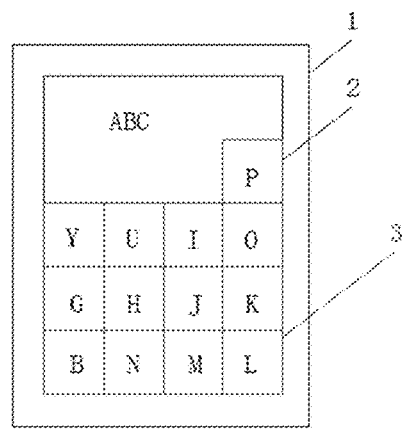

Further, it is also possible to arrange keys in the key region of the virtual keyboard according to the application type of input characters, for example, when performing an input operation by applying a calling program, with the arrangement of a virtual keyboard as shown in FIG. 2A, keys in the virtual keyboard displayed in a touch display screen 2 of a touch control equipment 1 are arranged in a manner so that number keys take ten of 15 keys arranged in a key region 3, and the rest 5 keys may be a shift key, punctuation keys, etc. Of course, it is also possible to only arrange 10 keys in the key region of the virtual keyboard, and the 10 keys are all arranged to be number keys, as shown in FIG. 2B; of course, it is also possible to arrange by oneself 12 keys in the key region of the virtual keyboard, wherein 10 keys are arranged to be number keys, and the rest 2 keys are arranged to be the shift key, etc, as shown in FIG. 2C, thereby enlarging the press area of each key and avoiding the occurrence of misoperation effectively. When performing an input operation by applying programs such as sending a message and microblogging, with the arrangement of a virtual keyboard as shown in FIG. 3A, a current virtual keyboard is provided with only 13 of 26 letters, and the rest 2 keys may be provided to be the shift key, page down key, punctuation keys, or the like in order to ensure accuracy of each touch pressing. Of course, it is possible to arrange 15 letters in the current virtual keyboard. When the user needs to input other 13 or 11 letters, a target virtual keyboard on a next screen is displayed by switching, as shown in FIG. 3B; it is also possible to arrange 13 keys in the current virtual keyboard, wherein the 13 keys are all letter keys, as shown in FIG. 3C. When the user needs to input other 13 letters, a next target virtual keyboard is reached by switching, as shown in FIG. 3D, wherein keys in the virtual keyboard can be arranged in the above manner. When it is required to perform operations on punctuation or function keys, the arrangement of keys in the virtual keyboard can be combined with other group keys or divided from other group keys as described above.

Because the number of keys arranged in the key region of the virtual keyboard is far less than the number of the digit group keys, letter group keys, punctuation group keys and the function group keys, it is necessary to additionally build a virtual keyboard with different key values so as to facilitate the inputting of all characters. Here, in order to facilitate differentiation, a virtual keyboard initially built in the touch screen is referred to as the current virtual keyboard, and a virtual keyboard built additionally is referred to as the target virtual keyboard. The area of the entire key region of the target virtual keyboard, the displaying position of the key region in the touch display screen and the number of keys in the key region can refer to the arrangement of the current virtual keyboard, and the number of building the target virtual keyboard is determined according to the determined number of keys in the key region and the number of the digit group keys, letter group keys, punctuation group keys and the function group keys, finally ensuring that keys in all virtual keyboards cover keys in all digit group keys, letter group keys, punctuation group keys and the function group keys. Main difference between the target virtual keyboard and the current virtual keyboard is different arrangement of keys in the key region. Keys in the key region of the target virtual keyboard are any keys, except the keys in the current virtual keyboard, selected at random from the digit group keys, letter group keys, punctuation group keys and the function group keys. Supposing the keys in the current virtual keyboard are A, S, D, F, H, J, K, L, 0, 1, 2, 3, comma, period and delete, keys in the target virtual keyboard are optionally Z, X, C, V, B, N, M, 4, 5, 6, 7, 8, 9, semicolon and backspace.

If the number of keys remaining to be not arrangement in the digit group keys, letter group keys, punctuation group keys and the function group keys is less than the determined number of keys in the key region of the virtual keyboard, the keys remaining to be not arranged are arranged in the key region of the virtual keyboard evenly. At this time, the area of each key in the key region of the target virtual keyboard built is greater than the area of each key in the key region of the virtual keyboard built previously; or, the area of each key in the key region of the target virtual keyboard built finally keeps consistent with the area of each key in the key region of the virtual keyboard built previously, shortening the area of the entire key region of the virtual keyboard. For example, the number of keys that is not arranged finally is 10, the key region is arranged into two lines, each with 5 keys.

Figure 4A:
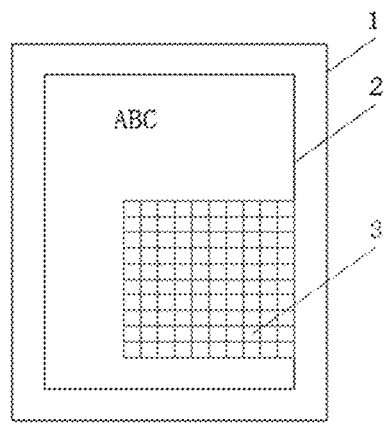
FIGS. 4A-4D are schematic views showing the shape of a virtual keyboard built according to the method for building the virtual keyboard as provided in the embodiment of the present disclosure and the arrangement position in a touch screen.
Figure 4B:
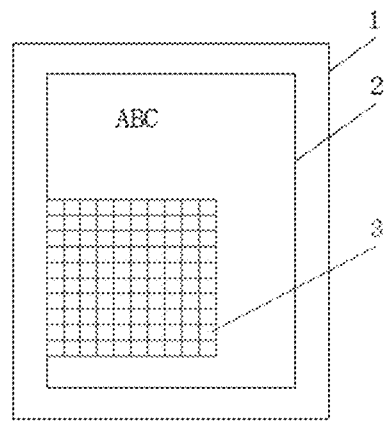
Figure 4C:
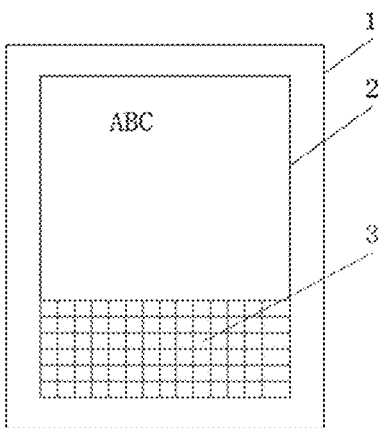
Figure 4D:
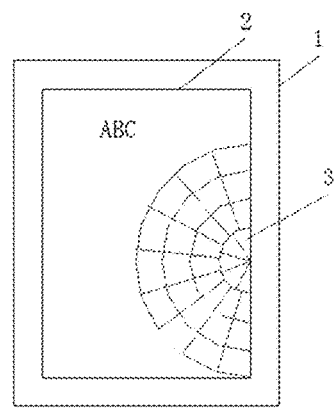

It has to be indicated that, the size and position of the key region of the virtual keyboard are adjustable according to the user's operation habits and visual effect. If an operation screen has a bigger size, and a controllable area of a thumb in one-hand operation is less than the screen, the key region may be placed one the right of the screen (as shown in FIG. 4A); if the user is accustomed to operate by left hand, the key region may be placed on the left of the screen (as shown in FIG. 4B); if the operation screen has a smaller size, the key region may be placed in a transverse area of the screen (the entire lower half part of the screen as shown in FIG. 4C) or in the upper/middle part, etc, which is adjustable by the user himself according to his habits. Of course, in addition to the rectangle shape, the key region may be in a fan shape suitable for a one-thumb operation (as shown in FIG. 4D) or in any other shape.

Figure 5:
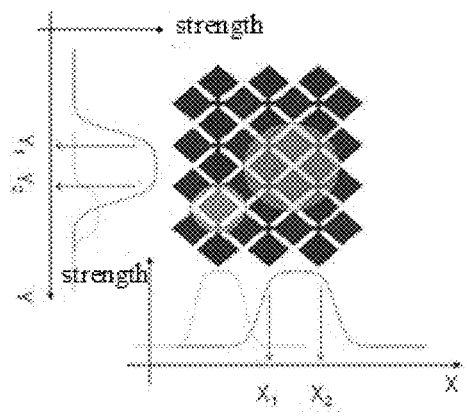
FIG. 5 is a schematic view showing a method for detecting area in the method for building a virtual keyboard as provided in the embodiment of the present disclosure.

When detecting the touch area of finger operation, it is possible to provide a test interface in the touch screen. The user presses the interface according to usual operation habits, and by testing this pressing region, the touch area produced in one-finger pressing can be obtained. The specific method for detecting the touch area of finger operation comprises detecting the coordinate of mutual capacitance: electrodes in a transverse direction (or longitudinal direction) issuing excitation signals in sequence, all electrodes in the longitudinal direction (or transverse direction) receiving the signals simultaneously so that it is possible to obtain the capacitance value at the intersection of electrodes in both translational and longitudinal directions, i.e., the capacitance of a two-dimensional plane of the entire touch screen. Because the touch screen is formed by arrangement of touch control electrodes with multiple rows and multiple columns, the area of each group of electrodes is usually less than the press area of an ordinary person's finger in order to increase measurement accuracy. When the finger touches the touch screen, multiple touch points in one region will be produced, and according to data of two-dimensional capacitance variation of the touch screen, it is possible to calculate the coordinate of each of the touch points. Because the frequency of scanning signals of touch operation is far higher than finger touching time, a plurality of coordinates will be detected in one scanning cycle. These coordinates correspond to one pressing region, and a touch control system calculates the actual area corresponding to the coordinate group region through algorithm or software according to the actual area of each group of electrodes so as to obtain the press area of user's touch operation. As shown in FIG. 5, actual press area $a=F(\alpha(x2-x1), \beta(y2-y1))$, and x in the coordinate system at the lower part of the figure represents the coordinate of transverse electrodes, and the longitudinal coordinate represents the strength of excitation signals issued by longitudinal electrodes; y in the coordinate system on the left of the figure represents the coordinate of longitudinal electrodes, and the longitudinal coordinate represents the strength of excitation signals issued by transverse electrodes, wherein $\alpha$ is a corresponding coefficient when a X-axis coordinate region is converted into actual distance, $\beta$ is a corresponding coefficient when Y-axis coordinate region is converted into actual distance, and F is an area calculating formula (it is possible to be based on formulae such as a formula of area of a circle, alternatively a formula of an ellipse because the user's pressing region is usually approximately elliptical).

Wherein, the method for detecting the touch area can be conducted in a manner such as far-infrared testing (since human body emits far-infrared ray all the time, it is possible to check the area of the pressing region of user's finger by means of a touch screen with far-infrared detecting layer) in addition to the mutual capacitance.

Furthermore, in detecting the finger's touch area, the above testing interface can be omitted. When the touch system performs touch scanning, it takes the first cycle or the preceding cycles as press area detecting time periods automatically. Due to fast scanning frequency, the user's press area can be obtained under the condition of not affecting user's actual operation so as to automatically divide a key interface that may be operated subsequently into key areas applicable to users. Of course, it is also possible to place the detecting process in the processes such as starting and unlocking process since the user usually uses operations such as sliding and clicking in everyday situations to start and unlock the touch screen, such that the finger's touch area can be detected in the starting and unlocking process.

After completion of building all virtual keyboards, it is possible to display the virtual keyboards in a predetermined position of the touch screen according to user's input operation command, and generally, to be displayed in the touch screen when the user issues an input operation command is a current virtual keyboard. The user may input characters in the current virtual keyboard, and if the current virtual keyboard has no character to be input, it is required to switch the current virtual keyboard to a target virtual keyboard with the character to be input.

Figure 6A:
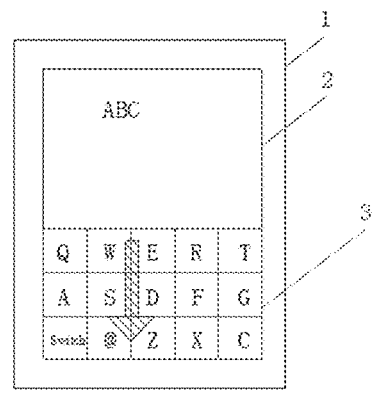
FIGS. 6A-6B are schematic views showing keyboard switching performed through gesture operation in a virtual keyboard built according to the method for building the virtual keyboard as provided in the embodiment of the present disclosure.
Figure 6B:
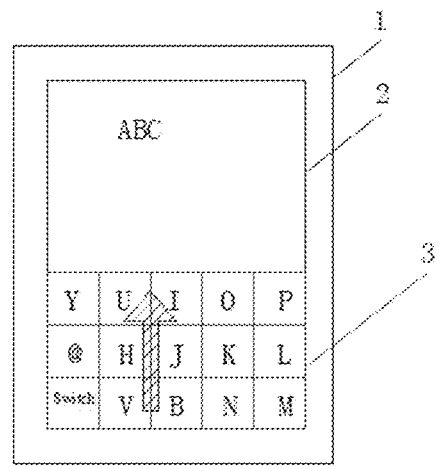

Switching between virtual keyboards can be performed in the touch screen according to a switch command of the virtual keyboard, and whether the command for switching the virtual keyboards is issued can be implemented by gesture operation, for example, switching is performed with a certain special operation such as finger's sliding up and down of a user on the touch screen, to be specific, finger's sliding operation (sliding downward as shown in FIG. 6A) is performed in the key region in the displaying state of the key region, then the current virtual keyboard is automatically switched to a target virtual keyboard of a next screen; when the user needs to return to the current virtual keyboard of the last screen, a figure simply performs reverse sliding operation on the target virtual key board (sliding upward as shown in FIG. 6B), and then the touch control equipment is automatically switched to the current virtual keyboard of the last screen to display; wherein gesture operations are collected by a gesture collecting device, and generally, a touch screen or a camera is selected as the gesture collecting device; finger's sliding operation is not limited to slide up and down, and it may be arranged to slide left and right or slantly according to user's operation habits; a certain special operation except the above sliding may be arranged to be performed on a certain special region such as non-key region on the screen, for example, double clicking on any position of a content displaying area, sliding in a L shape or in any shape, thereby achieving the switching between virtual keyboards; the above operations can be combined in any way.

Figure 7:
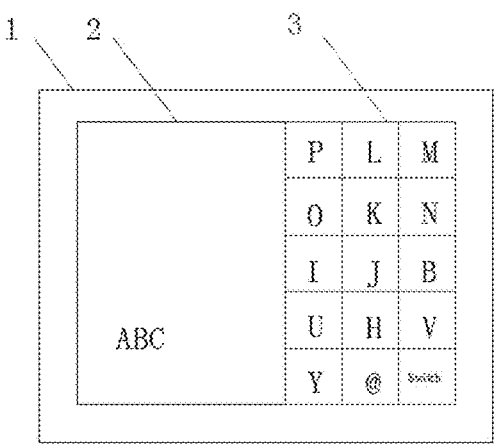
FIG. 7 is a schematic view showing keyboard switching performed through a gravity sensor in a virtual keyboard built according to the method for building the virtual keyboard as provided in the embodiment of the present disclosure.

Furthermore, whether the command for switching virtual keyboards is issued can be also implemented via a sensor on the touch control equipment. For example, it is possible to arrange a gravity sensor on the touch control equipment. When the user performs an operation in such a manner as a long side is perpendicular to the ground, to be displayed is the current virtual keyboard as shown in FIG. 3A. when it is necessary to be switched to another target virtual keyboard, it only needs to rock the telephone or rotate a twist so that the long side of mobile terminal is parallel to the ground, the gravity induction sensor transmits sensing signals to a microprocessor, and the microprocessor receives the sensing signals to issue a switch command so as to switch to a target virtual keyboard of the next screen, as shown in FIG. 7. The position of arranging the gravity sensor in the touch control equipment is not limited particularly, alternatively, integrating it in the circuit of the touch control equipment to simplify structure. it is also possible to perform switch between virtual keyboards in other sensing ways, for example, a sound sensor.

Figure 8:
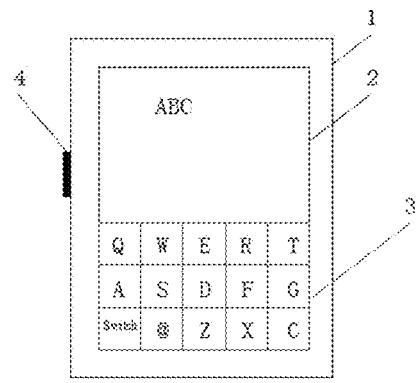
FIG. 8 is a schematic view showing a touch control equipment with a physical switch key as provided in the embodiment of the present disclosure.

More conveniently, it is possible to arrange physical switch key on the touch control equipment, or arrange virtual switch key on the virtual keyboard. As shown in FIG. 8, during performing thumb's key operation, the user may press a physical key 4 or a virtual key with other fingers such as a forefinger to issue a switch command so that the switch between virtual keyboard is performed, wherein position of the physical switch key 4 in the touch control equipment can be placed arbitrarily, for example, on a side or back of the touch control equipment, and in order to adapt to one-hand operation of users, preferable, at a left border where the forefinger is located when the user catch the screen with right hand; the physical switch key 4 may project from the outline board of mobile terminal, or may be imbedded into the outline border so long as the user is capable of touching conveniently.

Figure 9:
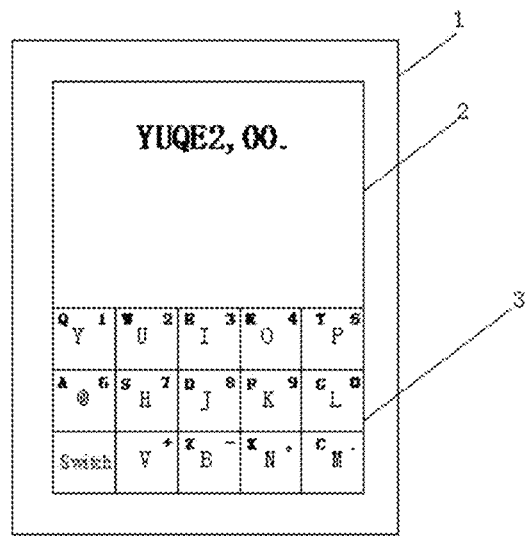
FIG. 9 is a schematic view showing a touch control equipment of building a virtual keyboard as provided in the embodiment of the present disclosure.

The above embodiment is the manner for building a plurality of virtual keyboards in the touch screen. Besides, it is possible to build only one virtual keyboard in the touch screen to implement the inputting of all characters, which simply needs to define multiple key values for each of the determined number of keys, as shown in FIG. 9. For example, the determined number of keys to be arranged in the key region of the virtual keyboard is 15, and the letter group keys, digit group keys, punctuation group keys and function group keys include 45 characters in total, then it is possible to obtain that 3 key values are alternatively defined in each key according to the total number of characters of the letter group keys, digit group keys, punctuation group keys and function group keys and the determined number of keys to be arranged, wherein each of the key values represents one character among the characters included in the letter group keys, digit group keys, punctuation group keys and function group keys, 15 keys include 45 key values, and the 45 key values correspond to 45 characters, that is, one virtual keyboard can implement the outputting of all characters of the letter group keys, digit group keys, punctuation group keys and function group keys. The output key values of each key can be controlled through gesture operation, for example, pressing a key once corresponds to a first key value of the key, pressing the same key twice successively corresponds to a second key value of the key, and pressing the same key three times successively corresponds to a third key value. Three key values corresponding to three characters Q, Y and 1 are defined on a certain key in the virtual keyboard, and pressing the key once outputs a first key value Y of the key, pressing the same key twice successively corresponds to a second key value Q of the key, and pressing the same key three times successively corresponds to a third key value 1 of the key.

It has to be indicated that the number of key values defined on each key can be changed according to actual conditions. For example, the determined number of keys in the virtual keyboard is 15, but the total number of characters in the letter group keys, digit group keys, punctuation group keys and function group keys is changed to 50, then it is possible to obtain that 4 key values are required to be defined on 5 of 15 keys and the rest 10 keys are still defined with 3 key values according to the total number of characters of the letter group keys, digit group keys, punctuation group keys and function group keys and the determined number of keys in the virtual keyboard; correspondingly, if the determined number of keys in the virtual keyboard is 12, but the total number of characters in the letter group keys, digit group keys, punctuation group keys and function group keys is 45, then 4 key values need to be defined on 9 of 12 keys, and the rest 3 keys are still defined with 3 key values. Furthermore, the type of character corresponding to key values of each key can be changed correspondingly according to actual conditions. For example, initial key values of one key are defined to three key values corresponding to three characters A, S and D, and the user can amend the key value parameter of the key according to one's own operation habits and grammatical features to change the key values of the key into three key values corresponding to three characters A, F and G.

In the embodiment, different key values of a key are output by pressing the key several times successively, alternatively, different key values of each key may be output in other manners, for example, different key values are output in a combined manner of touching and sliding a key. If three key values corresponding to three characters Q, Y and 1 are defined on a key in the virtual keyboard, the manner for outputting the three key values may be selected as follows: pressing a key is defined to outputting a first key value Y of the key, pressing and sliding leftward the key is defined to outputting a second key value Q of the key, and pressing and sliding rightward the key is defined to outputting a third key value 1 of the key.

As compared with the above embodiment, this embodiment only needs to build a virtual keyboard, which simplifies the way for building the virtual keyboard. Furthermore, it is not necessary for the user to perform a switch operation between virtual keyboards when inputting characters with the virtual keyboard so that the inputting of the characters becomes more quick and convenient.

Figure 10:
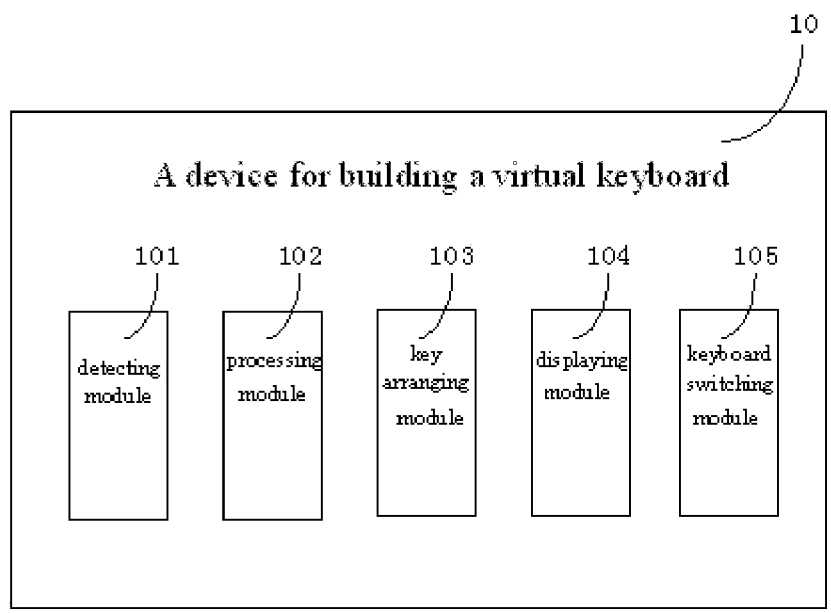
FIG. 10 is a schematic view showing the structure of a device for building a virtual keyboard as provided in the embodiment of the present disclosure.

FIG. 10 is a schematic view showing the structure of a device for building a virtual keyboard, wherein A device 10 for building a virtual keyboard, comprising a detecting module 101 configured to detect a touch area of finger operation;

a processing module 102 configured to determine the number of keys to be arranged in a key region of the virtual keyboard according to the detected touch area of finger operation and an area of the key region of the virtual keyboard; and a key arranging module 103 configured to arrange the determined number of keys in the key region of the virtual keyboard according to a preset strategy. The specific way for the key arranging module 103 to arrange keys in the key region has been described detailedly in the method above, and is not stated here again.

Alternatively, the building device 10 further comprises a displaying module 104 configured to display the virtual keyboard where the keys are arranged in a touch screen of the touch control equipment.

Alternatively, the device for building the virtual keyboard further comprises a keyboard switching module 105 configured to receive a switch command of the virtual keyboard and switch between the current virtual keyboard and the target virtual keyboard according to the switch command of the virtual keyboard.

Finally, it should be pointed out that, the above embodiments are only for specifying other than limiting the technical solution of the present disclosure, and for one of ordinary skills in the art, many improvements and modifications can be made without departing from the principle of the disclosure, and all these improvements and modifications fall into the protection scope of the disclosure.

What is claimed is:

1. A method for building a virtual keyboard for use in a touch control equipment, comprising:
   detecting a touch area of a static press of a single finger of a user on a touch screen of the touch control equipment;
   determining a size of the touch area;
   determining a number of keys to be arranged in a keyboard area of the touch screen, wherein:
      determining the number of keys includes dividing a size of the keyboard area by the determined size of the touch area to obtain a first number, and
      the number of keys is less than or equal to the first number;
   selecting a subset of key values from a set of candidate key values according to operation habits of the user associated with the touch control equipment, wherein a count of the subset of key values is equal to the determined number of keys;
   arranging keys in the virtual keyboard according to a preset strategy, wherein a number of the arranged keys is equal to the determined number of keys; and
   displaying the virtual keyboard within the keyboard area of the touch screen of the touch control equipment for the user to perform a touch operation, wherein for each key of the arranged keys, a size of the key when displayed is greater than or equal to the determined size of the touch area, and wherein the subset of key values are assigned to the arranged keys.

2. The method according to claim 1, wherein the set of candidate key values corresponds to digit group keys, letter group keys, punctuation group keys, and function group keys.

3. The method according to claim 2, wherein the detecting of the touch area of the static press of the single finger of the user on the touch screen of the touch control equipment includes:
   detecting data of capacitance variation of the touch screen during the static press of the single finger of the user,
   calculating coordinates of a plurality of touch points on a boundary line of the touch area during the static press of the single finger of the user according to the data of the capacitance variation, and
   determining the touch area based on the coordinates of the plurality of touch points.

4. The method according to claim 1, wherein:
   the set of candidate key values corresponds to digit group keys, letter group keys, punctuation group keys, and function group keys.

5. The method according to claim 4, wherein the detecting of the touch area of the static press of the single finger of the user on the touch screen of the touch control equipment includes:
   detecting data of capacitance variation of the touch screen during the static press of the single finger of the user,
   calculating coordinates of a plurality of touch points on a boundary line of the touch area during the static press of the single finger of the user according to the data of the capacitance variation, and
   determining the touch area based on the coordinates of the plurality of touch points.

6. The method according to claim 1, wherein:
   the set of candidate key values corresponds to digit group keys, letter group keys, punctuation group keys, and function group keys;
   all of the set of candidate key values are assigned to the arranged keys; and
   a number of key values assigned to each of the arranged keys is based on a total number of the candidate key values divided by the determined number of keys.

7. The method according to claim 6, wherein the detecting of the touch area of the static press of the single finger of the user on the touch screen of the touch control equipment includes:
   detecting data of capacitance variation of the touch screen during the static press of the single finger of the user,
   calculating coordinates of a plurality of touch points on a boundary line of the touch area during the static press of the single finger of the user according to the data of the capacitance variation, and
   determining the touch area based on the coordinates of the plurality of touch points.

8. The method according to claim 1, wherein:
   the virtual keyboard comprises a current virtual keyboard displayed in a current display interface of the touch screen and a target virtual keyboard displayed in a next display interface of the touch screen;
   the current virtual keyboard and the target virtual keyboard have different key arrangements; and
   the method further comprises receiving a switch command of the virtual keyboard and switching between the current virtual keyboard and the target virtual keyboard according to the switch command of the virtual keyboard.

9. The method according to claim 8, wherein:
   the touch control equipment includes a keyboard switching key, and
   the received switch command of the virtual keyboard is a command issued when the keyboard switching key is pressed.

10. The method according to claim 9, wherein the detecting of the touch area of the static press of the single finger of the user on the touch screen of the touch control equipment includes:
   detecting data of capacitance variation of the touch screen during the static press of the single finger of the user,
   calculating coordinates of a plurality of touch points on a boundary line of the touch area during the static press of the single finger of the user according to the data of the capacitance variation, and
   determining the touch area based on the coordinates of the plurality of touch points.

11. The method according to claim 8, wherein:
   the touch control equipment includes a gesture collecting device for collecting a gesture operation corresponding to the switch command, and
   the received switch command of the virtual keyboard is a command issued when the gesture collecting device collects the gesture operation.

12. The method according to claim 11, wherein the detecting of the touch area of the static press of the single finger of the user on the touch screen of the touch control equipment includes:
   detecting data of capacitance variation of the touch screen during the static press of the single finger of the user,
   calculating coordinates of a plurality of touch points on a boundary line of the touch area during the static press of the single finger of the user according to the data of the capacitance variation, and determining the touch area based on the coordinates of the plurality of touch points.

13. The method according to claim 8, wherein:

the touch control equipment includes a gravity sensor for collecting sensing signals corresponding to the switch command, and the received switch command of the virtual keyboard is a command issued when the gravity sensor collects the sensing signals.

14. The method according to claim 8, wherein:

the touch control equipment includes a sound sensor for collecting sensing signals corresponding to the switch command, and the received switch command of the virtual keyboard is a command issued when the sound sensor collects the sensing signals.

15. The method according to claim 8, wherein the detecting of the touch area of the static press of the single finger of the user on the touch screen of the touch control equipment includes:

detecting data of capacitance variation of the touch screen during the static press of the single finger of the user, calculating coordinates of a plurality of touch points on a boundary line of the touch area during the static press of the single finger of the user according to the data of the capacitance variation, and determining the touch area based on the coordinates of the plurality of touch points.

16. The method according to claim 1, wherein the detecting of the touch area of the static press of the single finger of the user on the touch screen of the touch control equipment includes:

detecting data of capacitance variation of the touch screen during the static press of the single finger of the user, calculating coordinates of a plurality of touch points on a boundary line of the touch area during the static press of the single finger of the user according to the data of the capacitance variation, and determining the touch area based on the coordinates of the plurality of touch points.

17. A device for building a virtual keyboard for use in a touch control equipment, the device comprising a memory and a processor, wherein:

the memory is configured to store computer-readable instructions;

the processor, by executing the computer-readable instructions, is configured to:

detect a touch area of a static press of a single finger of a user on a touch screen of the touch control equipment, determine a size of the touch area;

determine a number of keys to be arranged in a keyboard area of the touch screen, wherein:

determining the number of keys includes dividing a size of the keyboard area by the determined size of the touch area to obtain a first number, and the number of keys is less than or equal to the first number;

select a subset of key values from a set of candidate key values according to operation habits of the user associated with the touch control equipment, wherein a count of the subset of key values is equal to the determined number of keys;

arrange keys in the virtual keyboard according to a preset strategy, wherein a number of the arranged keys is equal to the determined number of keys; and display the virtual keyboard within the keyboard area of the touch screen of the touch control equipment for the user to perform a touch operation, wherein for each key of the arranged keys, a size of the key when displayed is greater than or equal to the determined size of the touch area, and wherein the subset of key values are assigned to the arranged keys.

18. The device according to claim 17, wherein:

the virtual keyboard comprises a current virtual keyboard displayed in a current display interface of the touch screen of the touch control equipment and a target virtual keyboard displayed in a next display interface of the touch screen of the touch control equipment;

the current virtual keyboard and the target virtual keyboard have different key arrangements; and the processor is further configured to receive a switch command of the virtual keyboard and switch between the current virtual keyboard and the target virtual keyboard according to the switch command of the virtual keyboard.

* * * * *